United States Patent
Gail et al.

[11] Patent Number: 5,975,535
[45] Date of Patent: Nov. 2, 1999

[54] BRUSH SEAL BETWEEN A ROTOR AND A STATOR IN A TURBINE MACHINE

[75] Inventors: Alfons Gail, Friedberg; Klemens Werner, Munich, both of Germany

[73] Assignee: MTU Motoren-und Turbinen-Union Muenchen GmbH, Munich, Germany

[21] Appl. No.: 08/939,304

[22] Filed: Sep. 29, 1997

[30] Foreign Application Priority Data

Oct. 2, 1996 [DE] Germany ............................ 196 40 689
Oct. 17, 1996 [DE] Germany ............................ 196 42 781

[51] Int. Cl.$^6$ .................................................. F16J 15/447
[52] U.S. Cl. .............................................................. 277/355
[58] Field of Search ............................................... 277/355

[56] References Cited

U.S. PATENT DOCUMENTS

| 4,209,268 | 6/1980 | Fujiwara et al. | 277/355 |
| 4,415,309 | 11/1983 | Atterbury | 277/355 |
| 4,541,741 | 9/1985 | Woodbridge et al. | 277/355 |
| 4,600,202 | 7/1986 | Schaeffler et al. | 277/355 |
| 4,678,113 | 7/1987 | Bridges et al. | 277/355 |
| 5,181,728 | 1/1993 | Stec . | |
| 5,316,318 | 5/1994 | Veau | 277/355 |
| 5,401,036 | 3/1995 | Basu | 277/355 |
| 5,474,306 | 12/1995 | Bagepalli et al. . | |
| 5,480,165 | 1/1996 | Flower | 277/355 |

FOREIGN PATENT DOCUMENTS

| 3514382 | 6/1986 | Germany . | |
| 3 720069 | 12/1987 | Germany . | |
| 3 828833 | 3/1990 | Germany . | |
| 3 907614 | 9/1990 | Germany . | |
| 3 828363 | 2/1992 | Germany . | |
| 195 27 781 | 9/1996 | Germany . | |
| 3-125081 | 5/1991 | Japan . | |
| 3-209068 | 9/1991 | Japan . | |
| 3209068 | 9/1991 | Japan | 277/355 |
| 1 541001 | 2/1979 | United Kingdom . | |
| 1598926 | 9/1981 | United Kingdom | 277/355 |

*Primary Examiner*—Anthony Knight
*Assistant Examiner*—John L. Beres
*Attorney, Agent, or Firm*—W. F. Fasse; W. G. Fasse

[57] ABSTRACT

A brush seal is provided for sealing, with minimized leakage, a circumferential gap (S), for example between a rotor (1) and a stator (2) in a gas turbine engine. The brush seal includes a bristle housing (4) rigidly mounted on the stator or the rotor, and bristles (6) having fixed ends securely and durably held in the housing (4) and free ends protruding toward and into the annular gap (S). The housing (4) includes two holder disks (5A, 5B) with an interspace (Z) therebetween, wherein the interspace includes at least one of an axially directed first clamping portion (8) and a radially directed second clamping portion (10), and a widened non-clamping portion (7A, 7B). The fixed ends of the bristles are clampingly held in the first and second clamping portions, while the free ends of the bristles extend generally toward the opposite rotor or stator while being movably supported and guided by the widened non-clamping portion of the interspace (Z). The bristles (6) may extend at a tilt angle in the circumferential direction and may be stitched, woven, or glued together at their fixed ends in order to form a single bristle packet.

34 Claims, 3 Drawing Sheets

BRUSH SEAL BETWEEN A ROTOR AND A STATOR IN A TURBINE MACHINE

FIELD OF THE INVENTION

The invention relates to a brush seal for sealing a gap between a rotor and a stator in a turbine machine such as a gas turbine engine.

BACKGROUND INFORMATION

Brush seals of the above mentioned general type are used in turbine machines, and especially gas turbine engines, to provide a seal with the minimum possible leakage at circumferential gaps, for example between a machine housing and rotor or around a rotary shaft of the turbine machine, between two spaces having different prevailing fluid pressures within the turbine machine. Generally, the bristles of the brush seal are held and guided so as to be elastically yieldable or movable in order to compensate for any eccentric or oscillating motions of the rotor or shaft relative to the housing, which may result, for example, from rotor imbalances or the like. In this context, brush seals have been recognized as advantageous over the previously long utilized labyrinth seals, because such labyrinth seals can only adapt themselves to eccentric shaft movements to a very limited degree. Furthermore, brush seals advantageously distinguish themselves over prior labyrinth seals by a lower production cost and a lower weight.

Brush seals are generally known having a brush housing including two support disks or holder disks with an interspace therebetween, and with the seal bristles held in the interspace. The housing is mounted on the rotor or stator of a turbine machine, so that the bristles are directed toward the opposite stator or rotor. Such a brush seal arrangement is, for example, disclosed in German Patent 3,720,069.

In order to achieve a long operating life for such a brush seal, it is essential that the brush bristles are securely and durably mounted and held in the seal housing, so that the bristles cannot come loose and fall out during operation. Namely, such a loss of bristles would at least reduce the seal effectiveness, and in the worst case could damage or destroy the rotor or other components of the turbine machine and thus jeopardize the operating condition of the machine. According to German Patent 3,907,614, the bristles of a brush seal are looped around a core ring, and the bristles together with the core ring are further encircled and held by a clamping ring. The clamping ring is split or slotted in the circumferential direction so that the free ends of the bristles are directed radially inwardly so as to project out of the clamping ring toward the rotor. The bristle ring that is embodied and held together in such a manner is then inserted between two holding disks which form the brush housing and which then exert and transfer the clamping force onto the clamping ring. Disadvantageously, such a known brush seal arrangement is relatively complicated in structure, and also requires complicated and time consuming assembly and maintenance steps.

SUMMARY OF THE INVENTION

In view of the above it is an object of invention to provide a brush seal of the above described general type that is improved in such a manner to achieve a simplified mounting and holding of the bristles in the brush housing as compared to the state of the art, while maintaining the same or even improving the reliability and durability of the securing of the bristles. Further objects of the invention are to avoid or overcome the other disadvantages of the prior art, and to achieve additional advantages, as are apparent from the present description.

The above objects have been achieved in a brush seal for sealing a gap between a rotor and a stator, according to the invention, including a bristle housing that comprises two holding disks mounted on the rotor or the stator, with an interspace between the two holding disks. The arrangement further includes seal bristles arranged in the interspace between the holding disks so as to extend toward the opposite rotor or stator. The interspace between the two holding disks has a special configuration including a clamping zone at a radially outer end of the interspace that clampingly holds radially outer fixed ends of the seal bristles. The clamping zone of the interspace includes at least one of a substantially axially directed first clamping portion and a substantially radially directed second clamping portion. Thus, the radially outer fixed ends of the seal bristles are clampingly held in at least either the axially directed first clamping portion or the radially directed second clamping portion of the interspace. Preferably, the interspace includes both the first clamping portion and the second clamping portion.

The present brush seal provides the advantage that the bristles are subjected to a deflection, due to the clamping of the radially outer bristle ends in the axial or radially directed clamping portion of the interspace between the two holding disks.

This deflection of the bristles causes an increased friction of the bristles relative to one another and relative to the bristle housing, which provides an increased frictional securing of the bristles. Moreover, the special interspace configuration according to the invention provides a certain form-locking hold or securing of the bristles due to the mating convoluted shape of the bristles and the clamping portion of the interspace. In this manner, the invention ensures a reliable and durable securing of the bristles in their housing, without requiring any additional clamping means such as a clamping ring or a core ring.

Due to the minimal number of components, which is reduced relative to the prior art, the invention considerably simplifies the production, i.e. reduces the production effort and cost, of the brush seal. Especially, since the holding disks require only a moderate deformation in the axial direction, the holding disks can easily be produced with the required shape using simple bending, pressing, and drawing operations. This is especially true in the embodiment in which the clamping of the bristles is carried out in a radially extending clamping portion of the interspace. Once the bristles have been placed between the two holding disks, the two disks with the bristles held therebetween can be joined together to form a bristle housing by means of welding, soldering, flanging or any other suitable joining technique. This results in a compact ring-shaped brush seal which may then simply be installed by appropriately mounting it on the stator or on the rotor depending upon the particular application.

In an alternative embodiment of the invention, the radially outer fixed ends of the bristles are secured by clamping in an axially directed first clamping portion of the interspace, and in a radially directed second clamping portion of the interspace between the two holder disks. Due to the plural or redundant provision of clamping in different directions, and due to the deflection of the bristles from the radial direction into the axial direction, an especially strong and durable securing of the bristles is achieved without significantly increasing the necessary production complexity or effort, which would arise by using additional complex components or the like.

In order to meet increased demands or requirements on the securing strength of the bristles in the housing, the fixed end portions of the bristles may additionally be stitched or glued together with one another in the clamping portions of the interspace, and at further locations if necessary for the specific function. In this manner, the production is also simplified, because it is no longer necessary to handle individual bristles, but instead a bristle packet of all the bristles adhered together may be handled as a single unit. If the joining of the bristles by stitching or gluing or the like is only necessary for improving the handling of the bristles during assembly of the brush seal arrangement, then this stitching or gluing may be removed after the bristles have been secured in the bristle housing.

The stitching or sewing or weaving of thread packages has the advantage that the resulting bristle packets may be produced in an expedient and economical manner. Furthermore, the stitching thread seams or for example the weft threads may be carried out to extend at a non-perpendicular angle relative to the bristle threads or fibers, whereby bristle packets having the bristles extending at an angle may easily be produced by cutting off the bristle thread or fiber courses parallel to and adjacent the weft threads or the stitching thread seams. Then, the bristle packets may be inserted and installed in the bristle housing in such a manner that the weft threads or stitching thread seams are arranged extending around the circumferential direction within the housing enclosure. In this manner it is possible to achieve a desired tilt angle of the installed bristles relative to the rotor radial directions, at an early stage in the production without requiring additional production steps. Brush seal arrangements having such bristle threads or fibers that are tilted or angled in the circumferential direction are necessary for sealing rotor-stator arrangements that operate at high rotational speeds. The weft threads or stitching thread seams may remain permanently in place so as to provide an additional holding and securing of the bristles to prevent them from falling out, in addition to the above described clamping of the bristles in the housing.

According to further details of the invention, the interspace between the two holding disks includes a curved or circular arcshaped portion forming a transition between the axially directed first clamping portion and the radially directed second clamping portion. This arrangement provides a first clamping location or particularly a first clamping shoulder for clamping the bristles in the first clamping portion of the interspace. Moreover, the radially directed second clamping portion may include a meanderloop shaped or convolute corrugation shaped second clamping configuration that is formed between a ring-shaped depression in the first holder disk and a corresponding ring-shaped bulge or protrusion in the second holder disk. A radially inner end portion of the interspace may be widened or expanded to allow some amount of free play movement of the bristles at their free ends adjacent the gap that is to be sealed.

BRIEF DESCRIPTION OF THE DRAWINGS

In order that the invention may be clearly understood, it will now be described, in connection with an example embodiment, and with reference to the drawings, wherein.

DESCRIPTION OF PREFERRED EXAMPLE EMBODIMENTS AND OF THE BEST MODE OF THE INVENTION

Figures 1, 2:
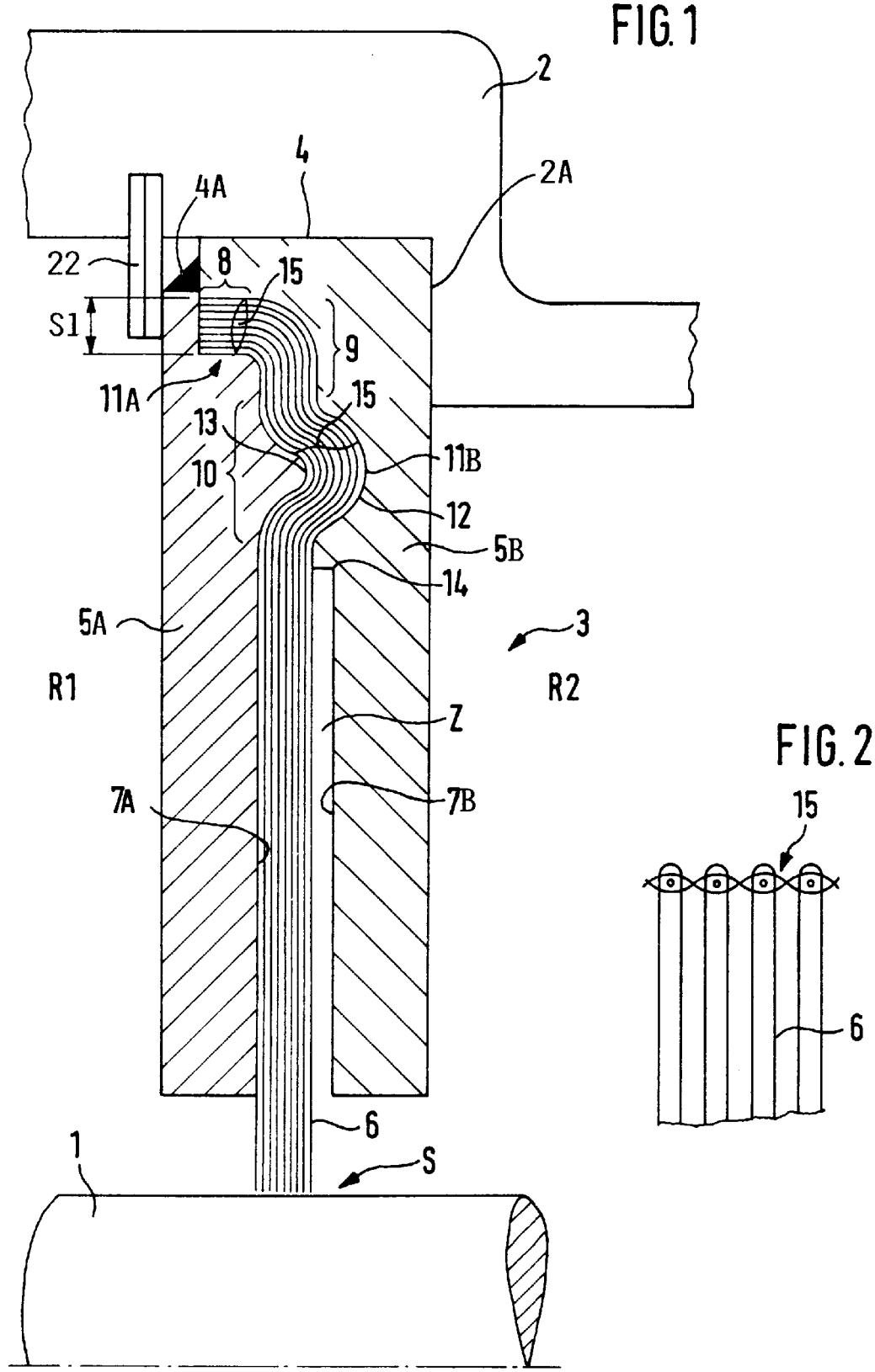
FIG. 1 is a lengthwise section of a pertinent portion of a rotor-stator arrangement with a brush seal according to the invention installed therein.
FIG. 2 is a schematic side view of an end portion of seal bristles that are stitched together with each other.

FIG. 1 shows a portion of a rotor-stator arrangement including a rotor 1 and a stator 2 as components of a gas turbine engine, which is not further shown in its entirety. Within the rotor-stator arrangement 1, 2, a first space R1 and a second space R2 are subjected to two different fluid pressures, and are to be sealed relative to one another with a minimum of leakage. For this purpose, a ring-shaped brush seal 3 is arranged substantially concentrically with the axis of the rotor-stator arrangement between the rotor 1 and the stator 2 in the annular space formed by the above-mentioned spaces R1 and R2. The brush seal 3 essentially comprises a bristle housing 4 including two holder disks 5A and 5B that are arranged coaxially to each other and joined together by a welded, soldered or flanged joint 4A, and a bristle bundle 6 that is secured in an interspace Z between the two holder disks 5A and 5B in such a manner that the free ends of the bristles 6 protrude radially inwardly against the outer circumferential surface of the rotor shaft 1 in order to seal the gap S between the rotor 1 and the stator 2. The bristle housing 4 is secured to the stator 2, for example by a securing ring 22 holding the housing 4 against a shoulder 2A of the stator 2.

The specific illustrated embodiment uses a two-fold clamping arrangement with a radially directed clamping portion and an axially directed clamping portion as will be discussed. It should be understood that this is also essentially representative of two simpler embodiments using only the radial clamping portion or the axial clamping portion as will be described.

The bristles 6 may be arranged in the housing 4 such that their radially inwardly directed free ends protrude toward the rotor 1 essentially radially, or with a circumferential tilt angle relative to the respective radial direction. In order to receive and hold the bristles 6 in this manner, the bristle housing 4 comprises an annular disk-shaped interspace Z arranged concentrically about the axis of the rotor-stator arrangement. This interspace Z is formed by means of appropriate corresponding profiling of the respectively opposed end faces 7A and 7B of the two holder disks 5A and 5B. At the radially outer area of the bristle housing 4, the interspace Z transitions into and ends in an axially directed, concentric, first clamping portion 8. A circular arc-shaped transition 9 connects and transitions from the first clamping portion 8 radially inwardly to a second concentric clamping portion 10 of the interspace Z.

The first clamping portion 8 provides a first clamping location or particularly a first clamping shoulder 11A on the first holder disk 5A, for clamping the bristles 6 especially with a radially directed clamping force. Namely, the first axial extending clamping portion 8 has a gap width S1 of a proper dimension that the radially outer ends of the bristles 6 are clamped therein in such a manner that the individual bristles 6 cannot slip out of the bristle housing 4, on the one hand due to the clamping, and on the other hand additionally due to the form-locking connection provided by the deflection of the bristles 6 from the radial direction into the axial direction.

The essentially radially directed second clamping portion 10 of the interspace Z comprises an additional clamping location or configuration 11B, which is embodied in the form of a meander loop shaped curve. To achieve this, the first holder disk 5A has a ring-shaped depression 12 therein, and the adjacent facing surface of the holder disk 5B has a corresponding ring-shaped bulge or convex projection 13, so that the bristles 6 running through this second clamping portion 10 extend with a substantially Ω-shaped lengthwise sectional shape in this area. This configuration achieves a further improved holding of the bristles 6 in the bristle housing 4, because it exerts both axially and radially directed clamping force components and an interlocking configuration on the bristles 6.

Radially inwardly from the second clamping portion 10, the end face 7A of the first holder disk 5A extends substantially flat or straight, so as to contact or guide the radially inner free end portions of the bristles 6 from the second clamping portion 10 radially inwardly to the sealing gap S. However, the opposite end face 7B of the second holder disk 5B has a step or set-back 14 at the radially inner end of the second clamping portion 10, so that this face 7B is not in contact with, but rather is spaced from the bristles 6 in a normal resting state. Thus, the area or range over which the bristles 6 are clamped in the bristle housing 4 ends at a definite or distinct location defined by this step or set-back 14. With this arrangement, the radially inner free end portion of the bristles 6 between the step 14 and the sealing gap S are elastically deflectable in the circumferential direction, and to a limited extent also in the axial direction, so that an eccentric running motion of the rotor 1 can be compensated for while still providing an effective seal.

In order to simplify the assembly and installation of the brush seal 3, the bristles 6 are connected or held together in the area of their radially outer ends, or especially in the area of the first clamping portion 8, by means of a fixing or binding thread 15, so that the bristles 6 are more easily handleable while being inserted or installed in one of the two holder disks 5A or 5B. In other words, the individual bristles 6 are joined together to form a bristle bundle or packet 6. Preferably, in order to provide an additional holding of the bristle bundle 6 in the housing 4, the fixing thread or stitching 15 is carried out in a multi-ply fashion using warp and weft threads as shown in FIG. 2, for example. Another fixing thread stitching line 15 is provided in the bristle bundle 6 in the area of the second clamping portion 10. Moreover, alternatively, reference number 15 in FIG. 1 may represent a glue applied to the bristles 6 so as to bind them together.

Figure 3:
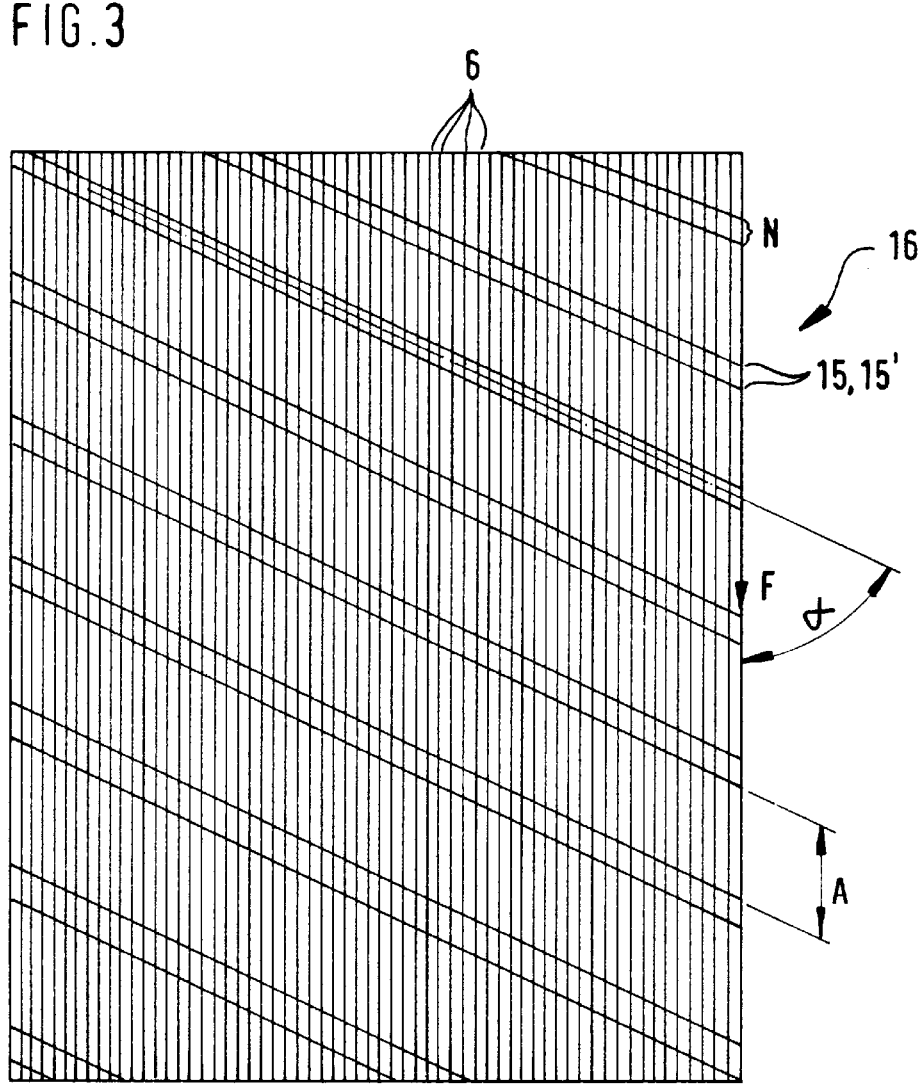
FIG. 3 is a schematic front view of a multi-layered thread package.
Figure 5:
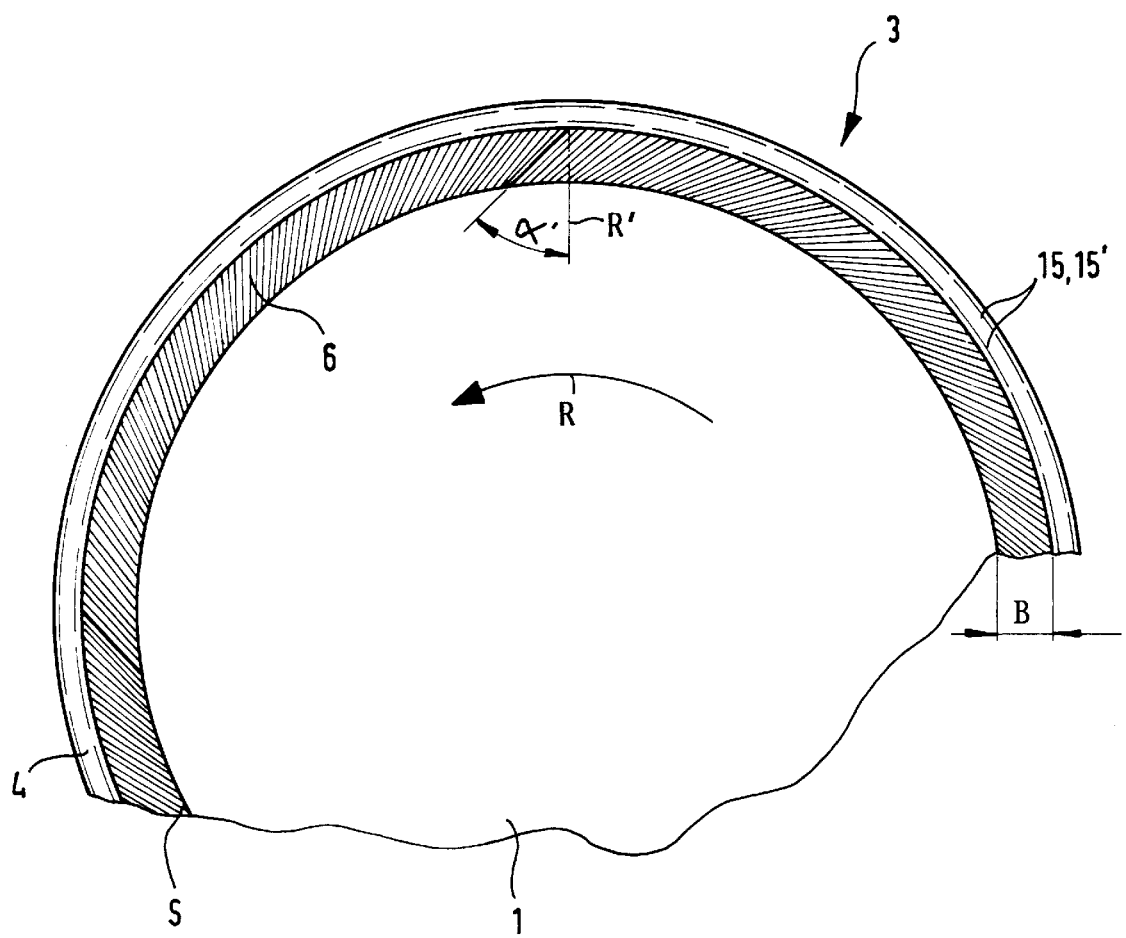
FIG. 5 is a partial end view of a ring-shaped brush seal using circumferentially angled bristles.

FIG. 3 shows a thread package 16 that forms an intermediate product for producing the brush seal 3 as shown in FIG. 5, especially for sealing from each other two stages in a rotor-stator arrangement of a gas turbine engine that is not shown in its entirety. The thread package 16 shown in FIG. 3 comprises a plurality of bristle threads or fibers 6 extending substantially parallel to one another in width and depth so as to form a substantially rectangular sheet or web.

Furthermore, the thread package 16 comprises stitching threads 15 or weft threads 15' running generally across the bristle threads or fibers 6. The stitching threads 15 or weft threads 15' may be substantially perpendicular to the bristle threads or fibers 6, to form a general brush seal as described above, but especially the stitching threads 15 or weft threads 15' extend at an angle α relative to the extension direction F of the bristle threads or fibers 6 for manufacturing a brush seal with bristles having a tilt angle in the circumferential direction.

In the illustrated embodiment, the stitching threads 15 or weft threads 15' cross the bristle threads 6 at an angle α of approximately 65°, which substantially corresponds to the final tilt angle α' of the bristles 6 in the circumferential direction relative to a radial R' of the rotor which rotates in direction R as shown in FIG. 5. The stitching threads 15 or weft threads 15' extending at an angle, run entirely through the rectangular thread package 16 from edge to edge thereof, as shown in FIG. 3. In the illustrated embodiment, the stitching threads 15 or weft threads 15' are carried out double-fold respectively in a stitching zone N, whereby the respective stitching zones N are offset from one another at the repeating linear spacing distance or offset A. As a result, the respective portions of the thread package 16 that lie between the stitching seam zones N and that are thus free of weft threads or stitching threads, correspond to the free bristle length B that is determined by the spacing A and the angle a through a simple trigonometric angular relationship, namely A sin α.

Figure 4:
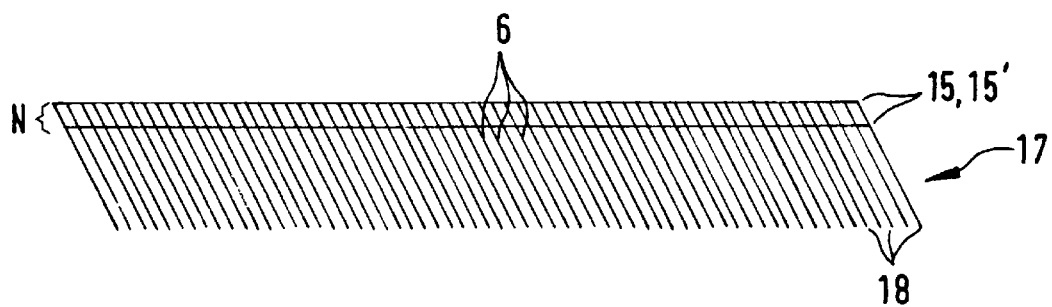
FIG. 4 is a schematic front view of a single course of bristles that are stitched together.

As the next step in processing the laid-up or woven thread package 16, individual bristle courses 17 are cut out of the thread package 16 by cutting along each respective stitching thread zone N, such that one edge of the bristle course 17 is formed by the stitched zone N and the opposite edge of the bristle course 17 is formed by the free end 18 of the bristles 6, as shown in FIG. 4. In other words, each cut for separating respective bristle courses 17 is carried out parallel to and directly adjacent the stitching threads 15 or weft threads 15'. The individual bristle courses 17 are then installed in a bristle housing 4 in such a manner that the stitching threads 15 or weft threads 15' come to rest within the bristle housing 4 while the free ends 18 of the bristles 6 extend toward the rotor 1 and protrude radially inwardly from the housing 4. If the weft threads 15' or stitching threads 15 are not necessary for achieving a secure seating and holding of the bristles 6 in the bristle housing 4 once it is in an assembled condition, then these threads may thereafter be removed from the housing 4.

Two different production methods can alternatively be used for producing the multi-layered thread package 16. In the first method, the thread package 16 of bristle threads or fibers 6 is first laid up in a multi-layered surfacial manner, and then the multi-layers are sewed or stitched together along a plurality of parallel extending stitching lines directed at a stitching angle α as described above, using stitching threads 15. In this context, the material of the stitching threads is preferably the same as that of the bristle threads or fibers. In the second, alternative method, the thread package 16 is produced by a weaving method. In this context, the warp threads form the bristles 6 and the spaced or relatively offset weft threads 15' cross and interweave the bristles 6 at an angle of approximately 65° in order to bind together the bristles 6. After a number of weft threads 15' have been picked, i.e. inserted into the warp threads forming the bristles 6, so as to form a woven band or margin in the stitching zone N, then the warp is advanced without inserting weft threads for a distance corresponding to the offset or spacing A before inserting the next group of weft threads 15'. In this manner, a weft free portion forms the free bristle length B, in which the free ends of the bristle threads or fibers 6 are not connected to one another and will protrude from the bristle housing and be deflectable or yieldable without hindrance in the final assembled condition, as described above.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A brush seal for sealing a gap between a rotating component and a stationary component, comprising a bristle housing adapted to be mounted on a first one of the rotating component or the stationary component, and a plurality of bristles having fixed ends held in said bristle housing and having free ends protruding from said bristle housing and adapted to be directed toward a second one of the rotating component or the stationary component, wherein said bristle housing comprises first and second holder disks with an interspace formed therebetween, wherein said interspace includes a first clamping portion extending substantially parallel to an axial direction of said bristle housing and a second clamping portion arranged radially inwardly from said first clamping portion and extending substantially in a radial direction of said bristle housing, wherein radially outer end portions of said fixed ends of said bristles are received and clampingly held in said first clamping portion and radially inward portions of said fixed ends of said bristles are received and clampingly held in said second clamping portion, and wherein at least one of said first and second holder disks comprises a second clamping configuration that is so configured and arranged at said second clamping portion such that said second clamping configuration applies an axially directed clamping force component and a radially directed clamping force component to said radially inward portions of said fixed ends of said bristles in said second clamping portion.

2. The brush seal according to claim 1, wherein said interspace further includes an arc-shaped portion formed by said second clamping configuration.

3. The brush seal according to claim 1, wherein said interspace further includes a transition portion located and arranged between said first clamping portion and said second clamping portion such that at least one of said first and second holder disks includes a first clamping shoulder at said first clamping portion for clamping said radially outer end portions of said bristles in said first clamping portion.

4. The brush seal according to claim 3, wherein said first clamping shoulder is so configured and arranged such that said first clamping shoulder applies a radially directed clamping force to said radially outer end portions of said bristles in said first clamping portion.

5. The brush seal according to claim 1, wherein said second clamping configuration includes an annular depression in said first holder disk at said second clamping portion and an annular protrusion with a shape corresponding to said annular depression in said second holder disk at said second clamping portion, such that said second clamping portion of said interspace has a meander loop shape and said radially inward portions of said fixed ends of said bristles extend curved through said meander loop shape.

6. The brush seal according to claim 1, wherein said interspace further includes a wider portion that is arranged radially inwardly from said second clamping portion and that is wider in an axial direction than said first and second clamping portions, and wherein said free ends of said bristles extend through said wider portion with free play clearance and without being clamped therein.

7. The brush seal according to claim 1, further comprising at least one binder thread arranged to bind together said plurality of bristles in at least one of said first and second clamping portions.

8. The brush seal according to claim 7, comprising at least two of said binder threads arranged to bind together said plurality of bristles respectively in said first clamping portion and in said second clamping portion.

9. The brush seal according to claim 7, wherein said at least one binder thread is woven into and among said plurality of bristles.

10. The brush seal according to claim 7, wherein said at least one binder thread is stitched into said plurality of bristles.

11. The brush seal according to claim 1, wherein said bristles are held in said bristle housing to extend on a radial plane respectively at a tilt angle relative to radial directions extending from a central axis of said housing.

12. The brush seal according to claim 1, further comprising an adhesive applied onto said plurality of bristles so as to bind together said plurality of bristles in at least one of said first and second clamping portions.

13. The brush seal according to claim 12, wherein said adhesive is applied onto and binds together said plurality of bristles in said first clamping portion and in said second clamping portion.

14. The brush seal according to claim 1, wherein said first and second holder disks respectively have a circularly symmetrical and uniform annular shape and are coaxially arranged about a central axis, and wherein said interspace is a circularly continuous, symmetrical and uniform cavity formed between said first and second holder disks.

15. The brush seal according to claim 1, wherein said first and second holder disks are joined together by at least one of a welded joint, a soldered joint, and a flanged joint.

16. A brush seal for sealing a gap between a rotating component and a stationary component, comprising a bristle housing adapted to be mounted on a first one of the rotating component or the stationary component, and a plurality of bristles having fixed ends held in said bristle housing and having free ends protruding from said bristle housing and adapted to be directed toward a second one of the rotating component or the stationary component, wherein said bristle housing comprises first and second holder disks with an interspace formed therebetween, wherein said interspace includes a first clamping portion extending substantially parallel to an axial direction of said bristle housing, a second clamping portion arranged radially inwardly from said first clamping portion and extending substantially in a radial direction of said bristle housing, and an arc-shaped transition portion between said first and second clamping portions, wherein radially outer end portions of said fixed ends of said bristles are received and clampingly held in said first clamping portion and radially inward portions of said fixed ends of said bristles are received and clampingly held in said second clamping portion.

17. The brush seal according to claim 16, wherein said interspace further includes a wider portion that is arranged radially inwardly from said second clamping portion and that is wider in an axial direction than said first and second clamping portions, and wherein said free ends of said bristles extend through said wider portion with free play clearance and without being clamped therein.

18. The brush seal according to claim 16, further comprising respective binder threads arranged to bind together said plurality of bristles respectively in said first clamping portion and in said second clamping portion.

19. A brush seal for sealing a gap between a rotating component and a stationary component, comprising a bristle housing adapted to be mounted on a first one of the rotating component or the stationary component, and a plurality of bristles having fixed ends held in said bristle housing and having free ends protruding from said bristle housing and adapted to be directed toward a second one of the rotating component or the stationary component, wherein said bristle housing comprises first and second holder disks with an interspace formed therebetween, wherein said interspace includes at least a first clamping portion that extends substantially parallel to an axial direction of said bristle housing and that is arranged at and clampingly receives at least radially outer end portions of said fixed ends of said bristles, wherein said interspace further includes a wider portion that is arranged radially inwardly from said first clamping portion and that is wider in an axial direction than said first clamping portion, wherein at least one of said first and second holder disks comprises a distinct offset step at a radially outer end of said wider portion of said interspace, and wherein said free ends of said bristles extend through said wider portion with free play clearance and without being clamped therein.

20. The brush seal according to claim 19, wherein said interspace further includes a second clamping portion that extends substantially in a radial direction of said bristle housing and that is arranged radially inwardly from said first clamping portion and clampingly receives radially inward portions of said fixed ends of said bristles, wherein said wider portion of said interspace is arranged radially inwardly from said second clamping portion and is wider in said axial direction than said second clamping portion, and wherein said distinct offset step is located at a transition between said second clamping portion and said wider portion of said interspace.

21. The brush seal according to claim 19, further comprising at least one of a binder thread and an adhesive arranged so as to bind together said plurality of bristles in said first clamping portion.

22. A brush seal for sealing a gap between a rotating component and a stationary component, comprising a bristle housing adapted to be mounted on a first one of the rotating component or the stationary component, a plurality of bristles having fixed ends held in said bristle housing and having free ends protruding from said bristle housing and adapted to be directed toward a second one of the rotating component or the stationary component, and at least one binder thread arranged to bind together said plurality of bristles, wherein said bristle housing comprises first and second holder disks with an interspace formed therebetween, wherein said interspace includes at least a first clamping portion that extends substantially parallel to an axial direction of said bristle housing and that is arranged at and clampingly receives at least radially outer end portions of said fixed ends of said bristles, wherein said bristles are held in said bristle housing to extend respectively at a tilt angle relative to radial directions extending from a central axis of said housing, wherein said at least one binder thread extends in a binder thread direction at a non-perpendicular angle relative to a direction of extension of said bristles, and wherein said non-perpendicular angle is essentially equal to said tilt angle.

23. The brush seal according to claim 22, wherein said interspace further includes a second clamping portion that extends substantially in a radial direction of said bristle housing and that is arranged radially inwardly from said first clamping portion and clampingly receives radially inward portions of said fixed ends of said bristles, and wherein said binder thread binds together said plurality of bristles in at least one of said first and second clamping portions.

24. A brush seal for sealing a gap between a rotating component and a stationary component, comprising a bristle housing adapted to be mounted on a first one of the rotating component or the stationary component, a plurality of bristles having fixed ends held in said bristle housing and having free ends protruding from said bristle housing and adapted to be directed toward a second one of the rotating component or the stationary component, and at least one binder thread, wherein said bristle housing comprises first and second holder disks with an interspace formed therebetween, wherein said interspace includes at least one clamping portion that extends substantially in a radial direction of said bristle housing and that clampingly receives at least portions of said fixed ends of said bristles, wherein said at least one binder thread is arranged to bind together said plurality of bristles in said clamping portion, wherein said bristles are held in said bristle housing to extend respectively at a tilt angle relative to radial directions extending from a central axis of said housing, wherein said at least one binder thread extends in a binder thread direction at a non-perpendicular angle relative to a direction of extension of said bristles, and wherein said non-perpendicular angle is essentially equal to said tilt angle.

25. A brush seal for sealing a gap between a rotating component and a stationary component, comprising a bristle housing adapted to be mounted on a first one of the rotating component or the stationary component, and a plurality of bristles having fixed ends held in said bristle housing and having free ends protruding from said bristle housing and adapted to be directed toward a second one of the rotating component or the stationary component, wherein said bristle housing comprises first and second holder disks with an interspace formed therebetween, wherein said interspace includes at least one clamping portion that extends substantially in a radial direction of said bristle housing and that clampingly receives at least portions of said fixed ends of said bristles, and wherein said first holder disk includes an annular depression at said clamping portion and said second holder disk includes an annular protrusion with a shape corresponding to said annular depression at said clamping portion, such that said clamping portion of said interspace has a meander loop shape and said portions of said fixed ends of said bristles extend curved through said meander loop shape.

26. The brush seal according to claim 25, wherein said interspace further includes a wider portion that is arranged radially inwardly from said clamping portion and that is wider in an axial direction than said clamping portion, and wherein said free ends of said bristles extend through said wider portion with free play clearance and without being clamped therein.

27. The brush seal according to claim 25, further comprising at least one binder thread arranged to bind together said plurality of bristles in said clamping portion.

28. The brush seal according to claim 25, wherein said bristles are held in said bristle housing to extend on a radial plane respectively at a tilt angle relative to radial directions extending from a central axis of said housing.

29. The brush seal according to claim 25, further comprising an adhesive applied onto said plurality of bristles so as to bind together said plurality of bristles in said clamping portion.

30. A brush seal for sealing a gap between a rotating component and a stationary component, essentially consisting of a bristle housing adapted to be mounted on a first one of the rotating component or the stationary component, and a plurality of bristles having fixed ends held in said bristle housing and having free ends protruding from said bristle housing and adapted to be directed toward a second one of the rotating component or the stationary component, wherein said bristle housing essentially consists of first and second holder disks with an interspace formed therebetween, and wherein said interspace includes at least one of a first clamping portion extending substantially parallel to an axial direction of said bristle housing and a second clamping portion extending substantially in a radial direction of said bristle housing, with said fixed ends of said bristles received and clampingly held therein.

31. The brush seal according to claim 30, wherein said interspace includes said first clamping portion.

32. The brush seal according to claim 30, wherein said interspace includes said second clamping portion.

33. A brush seal for sealing a gap between a rotating component and a stationary component, essentially consisting of a bristle housing adapted to be mounted on a first one of the rotating component or the stationary component, a plurality of bristles having fixed ends held in said bristle housing and having free ends protruding from said bristle housing and adapted to be directed toward a second one of the rotating component or the stationary component, and at least one of a binder thread and an adhesive binding together said bristles, wherein said bristle housing essentially consists of first and second holder disks with an interspace formed therebetween, and wherein said interspace includes a clamping portion extending substantially parallel to an axial direction of said bristle housing and clampingly receiving at least radially outer end portions of said fixed ends of said bristles.

34. A brush seal for sealing a gap between a rotating component and a stationary component, comprising a bristle housing adapted to be mounted on a first one of the rotating component or the stationary component, and a plurality of bristles having fixed terminal ends held in said bristle housing and having free terminal ends protruding from said bristle housing on a radial plane and adapted to be directed toward a second one of the rotating component or the stationary component, wherein said bristle housing comprises first and second holder disks with an interspace formed therebetween, wherein said interspace includes a clamping portion that extends coaxially parallel to an axial direction of said bristle housing and that is formed between a coaxially extending first circular cylindrical wall of said first holder disk and a coaxially extending second circular cylindrical wall of said second holder disk, and wherein said bristles respectively include axially extending portions that extend parallel to said axial direction, that are clampingly received in said clamping portion, and that respectively terminate at said fixed terminal ends.

\* \* \* \* \*

UNITED STATES PATENT AND TRADEMARK OFFICE
CERTIFICATE OF CORRECTION

PATENT NO. : 5,975,535
DATED : Nov. 2, 1999
INVENTOR(S) : Gail et al.

It is certified that error appears in the above-identified patent and that said Letters Patent is hereby corrected as shown below:

On the title page
under "FOREIGN PATENT DOCUMENTS" delete "3-209068 9/1991 Japan" first occurrence Col. 4, line 10, before "DESCRIPTION" insert "DETAILED";

Col. 5, line 6 before "configuration" insert "clamping";

Col. 6, line 21, after "angle" replace "a" by --$\alpha$--;

Signed and Sealed this

Twenty-third Day of May, 2000

Attest:

Q. TODD DICKINSON

*Attesting Officer*   *Director of Patents and Trademarks*